Oct. 20, 1959

E. J. SVENSON ET AL 2,909,084

MACHINE TOOL

Original Filed Oct. 1, 1946

INVENTORS.
Ernest J. Svenson
Swen H. Stone
By: Olson & Trexler   attys.

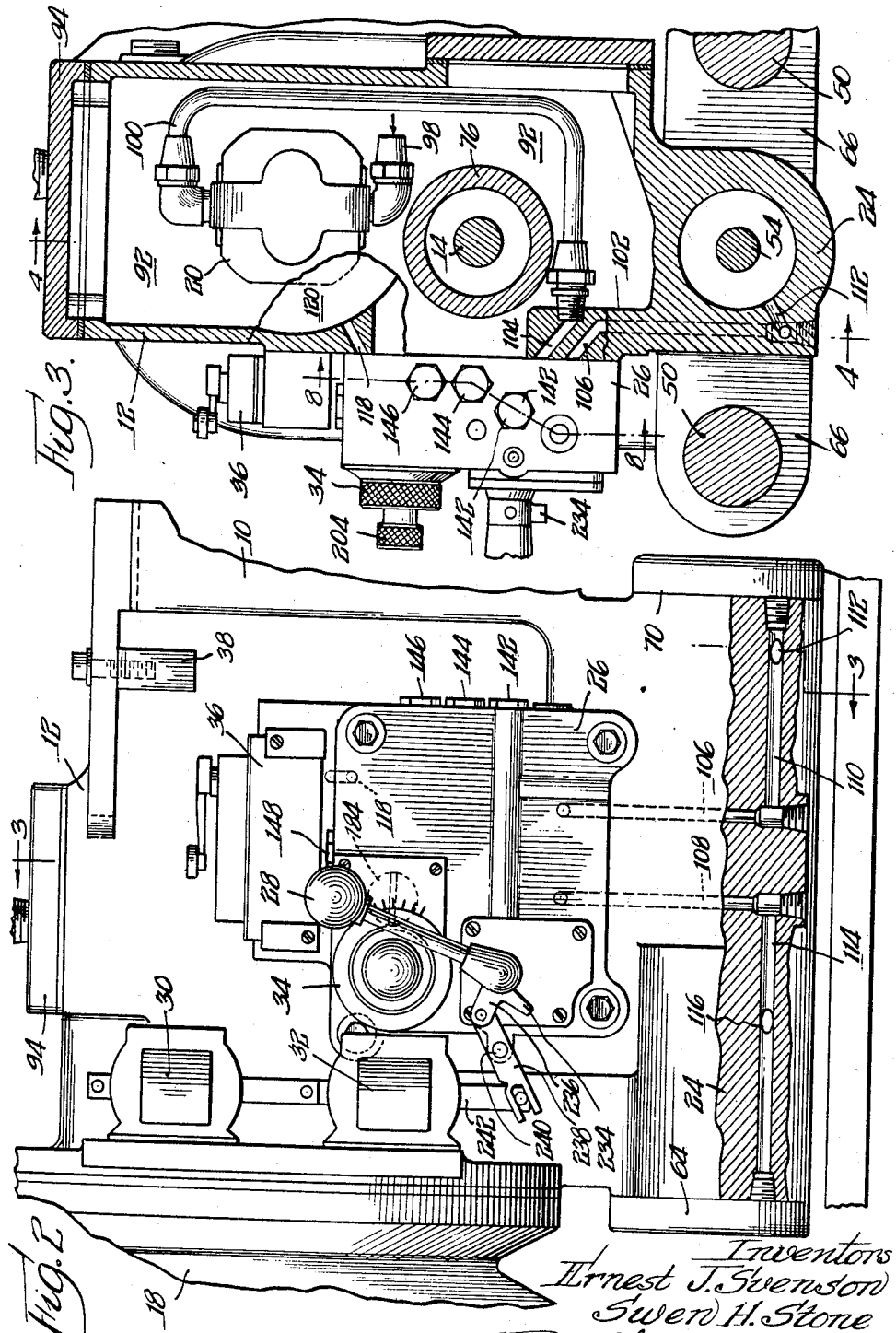

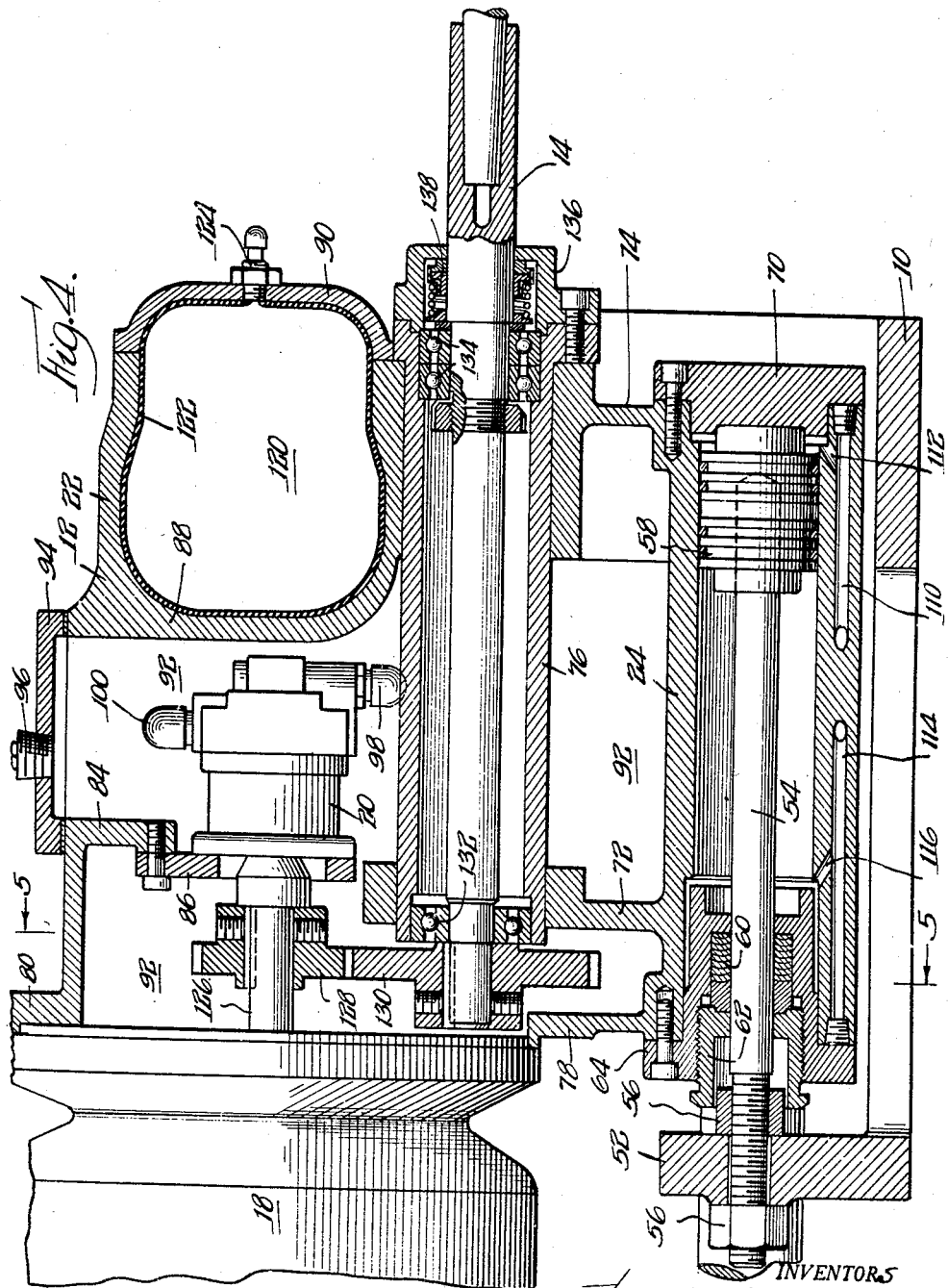

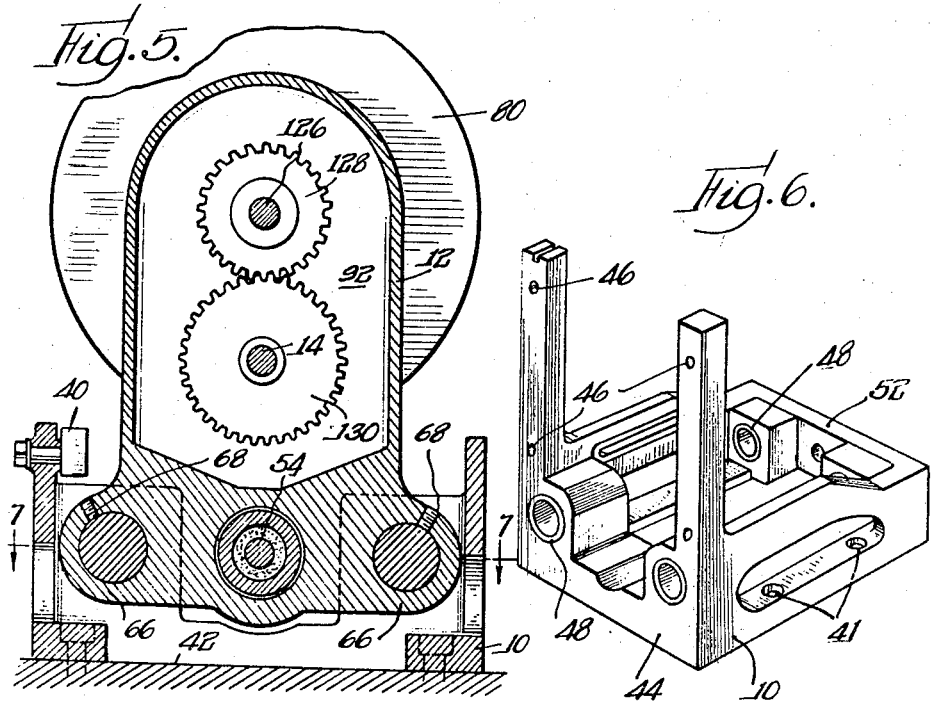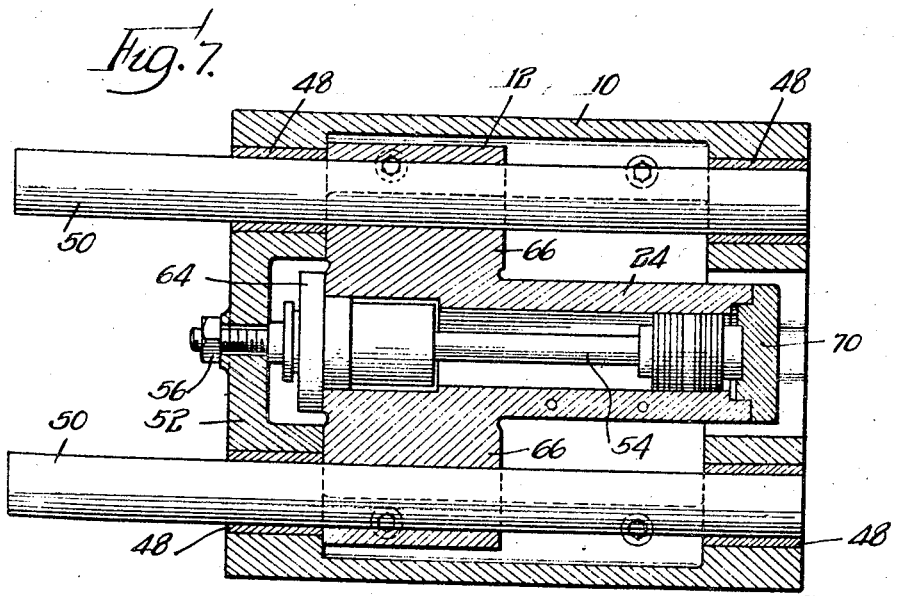

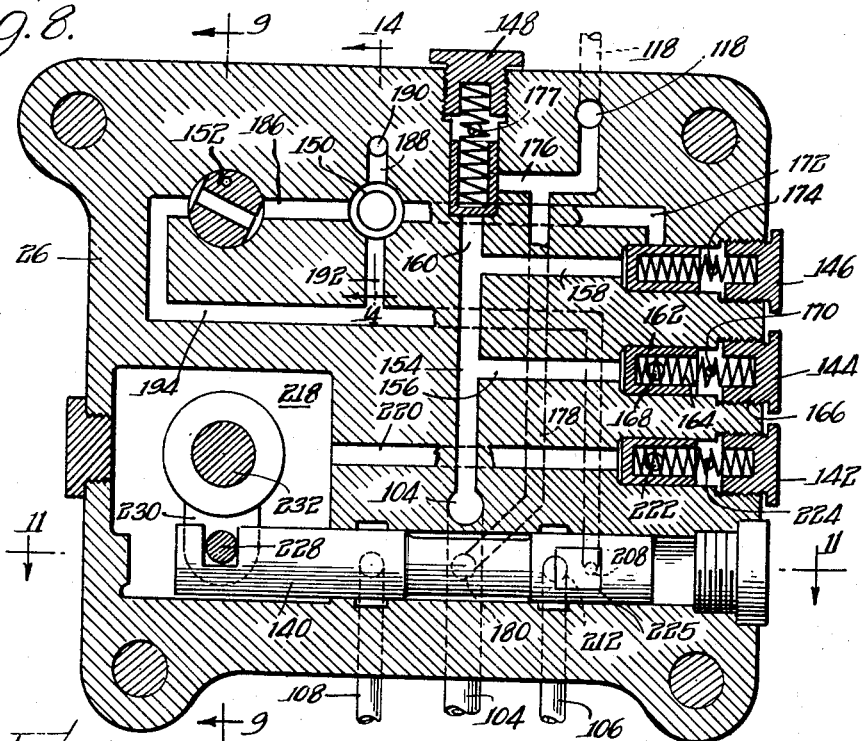
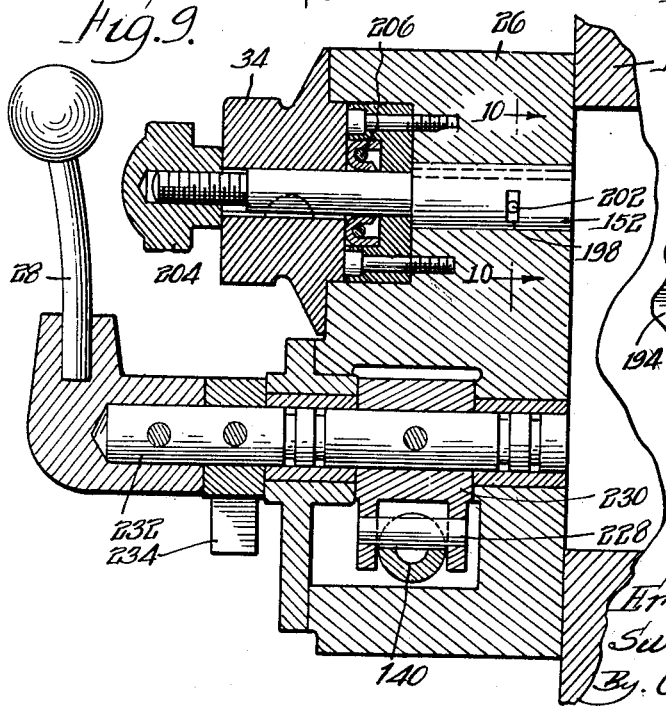
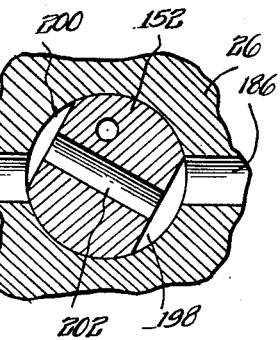

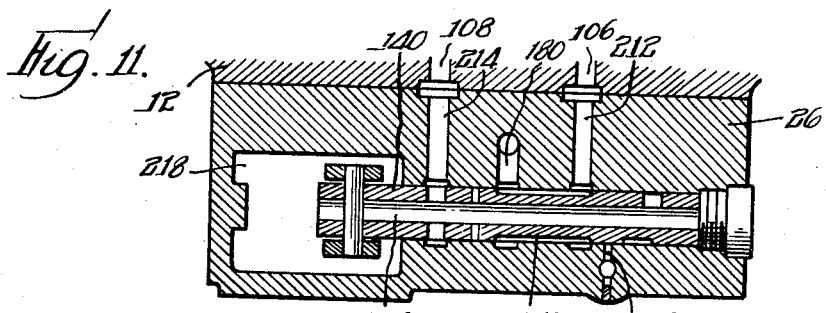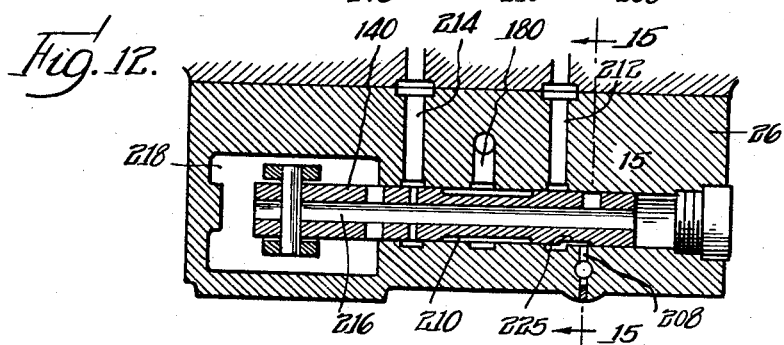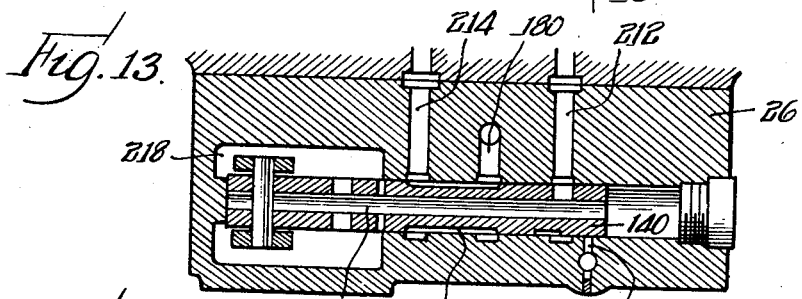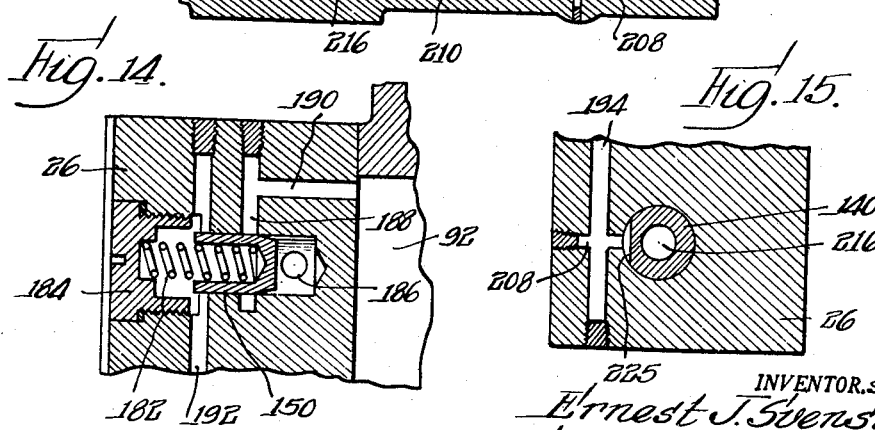

Oct. 20, 1959 E. J. SVENSON ET AL 2,909,084
MACHINE TOOL
Original Filed Oct. 1, 1946 7 Sheets-Sheet 7

INVENTORS
Ernest J. Svenson
Swen H. Stone
By: Olson & Trexler
attys.

United States Patent Office 2,909,084
Patented Oct. 20, 1959

2,909,084

MACHINE TOOL

Ernest J. Svenson and Swen H. Stone, Rockford, Ill., assignors to Odin Corporation, Chicago, Ill., a corporation of Illinois Original application October 1, 1946, Serial No. 700,468, now Patent No. 2,674,850, dated April 13, 1954. Divided and this application November 2, 1953, Serial No. 389,695

10 Claims. (Cl. 77—33.5)

This invention relates to machine tools and metal working apparatus, and concerns particularly a machine tool unit of the self-contained hydraulically actuated type.

It is an object of the invention to provide a machine tool unit of the foregoing type, of improved construction and operating characteristics.

More specifically stated, it is an object of the invention to provide in apparatus of the type defined, an improved arrangement of parts so as to facilitate the production of a small size, low cost machine tool unit which is at the same time self-contained and hydraulically operable through a full range of traverse and feeding movements.

A further object of the invention is to provide in a unit machine tool structure of the type defined an improved base and frame arrangement facilitating the mounting and use of the unit in various positions and in various types of installations, as may be required.

A still further object of the invention is to provide, in apparatus of the type defined, an improved hydraulic actuating system of increased efficiency, of lower power consumption with respect to the capacity of the machine, and of insured uniform and accurate feed rate over a full range of speed adjustment.

Another object of the invention is to provide, in apparatus of the type set forth, an improved arrangement of parts for facilitating the driving of the tool spindle and the pump for the hydraulic actuating system from a single power source.

Various other objects, advantages and features of the invention will be apparent from the following specification when taken in connection with the accompanying drawings wherein one preferred structural embodiment is set forth for purposes of illustration.

This application is a division of our application, Serial No. 700,468, filed October 1, 1946, and entitled "Hydraulic Actuating and Control Circuit for Machine Tools," now issued as Patent No. 2,674,850, dated April 13, 1954. The claims in the parent case are directed to the hydraulic actuator system. The claims in the present divisional application are directed to the machine tool unit.

In the drawings, wherein like reference numerals refer to like parts throughout:

Fig. 2 is a partial side view of the unit structure of Fig. 1, on a somewhat enlarged scale;

Fig. 3 is a transverse vertical section of the structure of Fig. 2 taken as indicated by the line 3—3 thereof;

Fig. 4 is a longitudinal vertical sectional view through the structure, taken as indicated by the line 4—4 of Fig. 3;

Fig. 5 is a transverse vertical section, on a reduced scale, and taken as indicated by the line 5—5 of Fig. 4;

Fig. 6 is a perspective view of the base;

Fig. 7 is a horizontal sectional view of the structure, taken as indicated by the line 7—7 of Fig. 5;

Fig. 8 is a vertical sectional view of the valve casing, somewhat diagrammatic in form, and taken as indicated by the line 8—8 of Fig. 3;

Fig. 9 is a partial sectional view of the valve taken as indicated by the line 9—9 of Fig. 8;

Fig. 10 is a partial sectional view of the feed speed control or adjustment means, taken as indicated by the line 10—10 of Fig. 9;

Figs. 11, 12 and 13 are views showing the different positions of the main control valve, taken as indicated by the line 11—11 of Fig. 8;

Fig. 14 is a sectional detail view of the compensating by-pass plunger forming another part of the feed speed control means, and taken as indicated by the line 14—14 of Fig. 8;

Fig. 15 is a sectional view through a portion of the main control valve, taken as indicated by the line 15—15 of Fig. 12;

General structure

Figure 1:
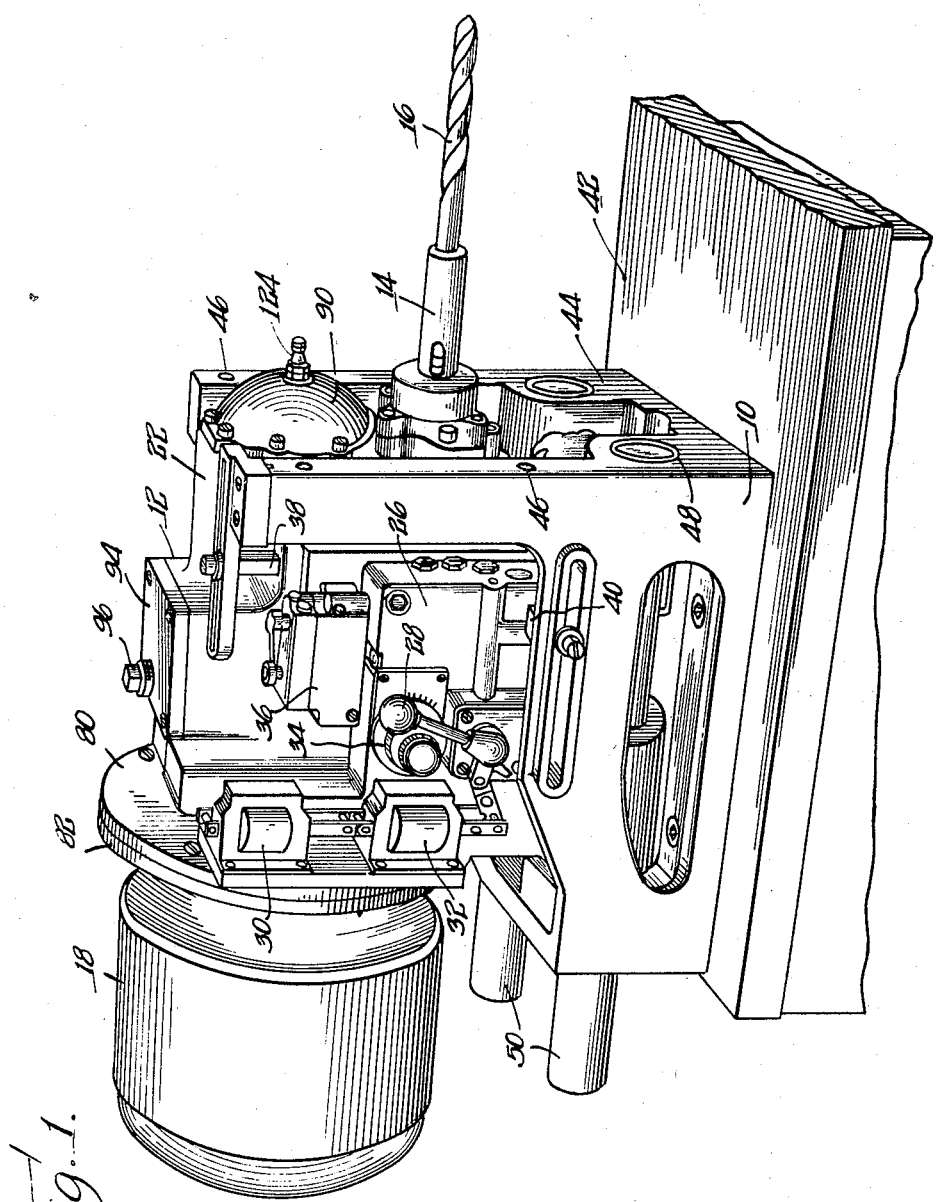
Fig. 1 is a perspective view of a self-contained, hydraulically actuated, automatic drill unit constructed with and embodying the principles of the invention, in accordance with one selected embodiment thereof.

Referring to Fig. 1, the unit illustrated comprises, in general, a base 10 carrying a shiftable frame 12, the latter being shiftable horizontally in respect to the base, when the unit is mounted in the position illustrated in Fig. 1.

The frame 12 carries a rotatable spindle 14 provided with a tool 16, illustrated as a drill in the particular embodiment shown, for engaging a work piece. The spindle is driven by a prime mover or electric motor 18 carried by and movable with the frame 12.

As best shown in Fig. 4, a pump 20 is carried within the frame 12 arranged to be driven by the motor, and forming the pressure source for the hydraulic system. The hydraulic system further comprises an accumulator 22, Fig. 4, the function of which will be later described, a cylinder 24 for propelling the frame, and a valve 26, Fig. 1, for controlling the functioning of the system. This valve is also carried by and moves integrally with the frame structure.

The valve is provided with a manual control handle 28 and a pair of solenoids 30 and 32 operable to control the shifting of the valve in the automatic cycle of the machine. The valve structure further includes a manual feed rate adjustment knob 34, the function of which will be later described. A limit switch 36 is provided as a part of the means for controlling the operation of the solenoids. The valve structure with its feed rate control, the solenoids, and the limit switch are all carried by the shiftable frame 12 so as to be movable as a unit therewith.

The limit switch is actuated by a control dog 38 adjustably carried by the base 10; the base also adjustably carrying a control dog 40 operable as the frame shifts to engage and actuate the valve actuating shaft on which the control handle 28 is mounted, as will be subsequently described.

Base structure and frame shifting means

The base 10 is illustrated in perspective detail in Fig. 6. It will be seen that in the particular embodiment shown the base is provided with a lower mounting face, and suitable bolt holes 41, so as to facilitate the mounting of the base upon a support surface parallel to the axis of the tool, such for example as the surface 42 illustrated in Fig. 1. The base is also provided with a front face 44 and suitable bolt holes as indicated at 46 to facilitate the mounting of the base upon a support surface perpendicular to the tool axis, as may in certain instances be desired.

It will thus be seen that the base can be readily mounted in various positions in respect to the tool axis, and in respect to the desired machining operations to be performed.

As will be understood, the base may be provided with angular support surfaces so as to accommodate the mounting of the unit at any desired angle and position in respect to the tool axis, the angle and position of the mounting face being disposed to suit the requirements of any particular installation.

As best shown in Fig. 7, the opposite sides of the base at its lower portion are provided with aligned openings having bearings 48 arranged to slidably receive a pair of support rods 50 secured to and movable with the frame 12. The base is also provided at its rear portion with an upstanding flange 52, Fig. 4, carrying a piston rod 54 cooperable with the actuating cylinder 24 formed as an integral part of the shiftable frame. The piston rod is adjustably supported on the flange 52 by a pair of adjustable lock nuts 56, and at its forward end carries a piston 58 cooperable with the bore of the cylinder 24 in the usual manner. A packing 60 and adjustable packing nut 62 are provided for preventing fluid leakage along the piston rod surface, the packing nut being carried by a flange plate 64 bolted to the end surface of the frame cylinder.

It will be seen that by reason of the structures provided, as pressure fluid is introduced into the cylinder 24 the frame 12 will be propelled in one direction or the other in respect to the fixed piston rod, the frame being guided in its movements by the shifting of the rods 50 through the bearings 48, providing a rigid yet readily shiftable guide structure.

Shiftable frame structure

As best shown in Figs. 5 and 7, the lower portion of the frame 12 is provided with a pair of oppositely extending bosses 66 within which the support rods 50 are secured by suitable means such as set screws 68. The cylinder body 24 is formed integrally with the bosses and is closed at its ends by the rear end cap 64, previously described, and a cooperable front end cap 70.

An intermediate wall 72, Fig. 4, projects upwardly from the cylinder 24, adjacent the rear end thereof, which in cooperation with front wall 74 forms the support for a sleeve 76 which surrounds the spindle 14 and is tightly fitted into the wall parts. The rear wall 78, Fig. 4, of the shiftable frame is formed at its upper portion as a flange 80, Fig. 1, to which the flange 82 of the drive motor 18 is secured.

Adjacent its upper portion the frame 12 is provided with a downwardly projecting intermediate wall 84, Fig. 4, to which there is bolted a support plate 86 carrying the pump 20. Adjacent its forward upper portion the frame structure is provided with a generally spherical wall 88 to which an end cap 90 is suitably bolted so as to provide the enclosed accumulator chamber 22.

The remaining internal chambers of the frame, such for example as indicated by the reference numeral 92 in Fig. 4, form a reservoir for the fluid medium, for example oil, used in the hydraulic propelling system. This composite chamber or reservoir is closed by a cap 94, a fill plug as indicated at 96, Fig. 1, being provided for introducing the oil into the reservoir in the use of the structure, as will be understood.

It will be seen that the pump 20 which, for example, may be any suitable form of gear pump, is disposed directly within the oil reservoir chamber 92. The pump is provided with an inlet conduit or fitting 98, Fig. 3, communicating with the reservoir, and with an outlet conduit 100 leading to a manifold plate 102 forming a part of the side wall of the frame or housing 12. This manifold plate is suitably drilled as indicated at 104 so as to permit the oil from the pump to be introduced into the valve casing 26. The manifold plate and adjacent portions of the frame are also drilled as indicated at 106 and 108, Figs. 2 and 3, so as to provide conduits communicating between the valve casing and the cylinder 24. As best shown in Figs. 2, 3 and 4, the passageways 106 and 108 communicate, respectively, with passageways 110—112 and 114—116 leading to the opposite ends of the cylinder structure.

A drilled passage 118, Fig. 3, leads through the upper wall of the frame or housing 12 and interconnects the valve casing 26 with the chamber 120 of the accumulator. The accumulator chamber is lined with a flexible bladder or diaphragm 122, Fig. 4, communicating with a fitting 124 in the cover plate 90. In the use of the structure a suitable gas such as air or nitrogen is introduced into the bladder through the fitting 124, to a suitable pressure. This internal gas pressure tends to expand the bladder into engagement with the chamber walls, as shown in Fig. 4, whereas when oil under pressure is introduced into the accumulator through the passage 118 the bladder will be displaced against the gas pressure. The detailed manner of functioning of the accumulator structure, in the operation of the hydraulic propelling circuit, will be later described.

Spindle drive

The motor 18 is provided with a drive shaft 126, Fig. 4, directly connected to drive the gear pump 20, and also carrying a pick-off gear 128 arranged to drive a pick-off gear 130 secured to the spindle 14.

The spindle is journalled within its sleeve or housing 76 by means of anti-friction bearings 132 and 134. An end cap 136 closes the forward end of the sleeve 76, an oil sealing arrangement being provided as indicated at 138 for preventing seepage of oil forwardly along the surface of the spindle.

It will thus be seen that the prime mover or motor 18 is employed as the power source for the pump and also for the spindle, the gear ratio between the pump and spindle being conveniently adjustable by substitution of the pick-off gears 128—130 in the usual manner.

Valve structure, hydraulic circuit, and operating mechanism

As best shown in Fig. 3, the valve casing 26 closes the forward wall of the reservoir 92, and cooperates with the manifold passages 104, 106, 108 and 118, as previously described.

The valve structure is best shown in Figs. 8–15.

Referring to Fig. 8, the control valve structure comprises a longitudinally reciprocable main control valve 140, a back pressure relief valve 142, a main relief valve 144, a speed control load or relief valve 146, an accumulator load or relief valve 148, a compensating relief plunger 150 forming a part of the feed speed control, and an adjustable orifice mechanism 152 forming another part of the feed speed control mechanism. In Fig. 8 the porting within the valve casing 26, interconnecting the various control valve parts, has been somewhat diagrammatically indicated, it being understood that the passages within the valve block or casing would in commercial practice be formed by a series of drilled and plugged passages, in the usual manner.

Referring further to Fig. 8, it will be seen that the valve block 26 is provided with a passage 154 leading from the inlet manifold port 104 from the pump. Passage 154 is provided with a plurality of branch passages 156, 158 and 160 leading, respectively, to the main relief valve 144, the speed control load or relief valve 146 and the accumulator load or relief valve 148.

Each of the four relief valves 142, 144, 146 and 148 is of the same construction, and referring for example to the main relief valve 144 comprises a spring pressed cup portion 162 urged by the pressure of spring 164 into closed position, the pressure of the spring being adjustable by a screw threaded cap 166 adjustably threaded into the valve block or casing 26.

When the valve member 162 of the main relief valve is urged by the fluid pressure to the right, as seen in Fig. 8, against the action of the spring 164, it provides communication between the conduit 156 and a relief port 168 drilled through the rear of the casing 26 and exhausting directly into the main fluid reservoir 92. The relief valve is further provided with a drain port 170 similarly drilled through the casing 26 into the reservoir 92, and providing exhaust passage for leakage fluid which escapes along the external wall surfaces of the valve cup.

The speed control load or relief valve 146, when opened, provides communication between the conduit 158 and a conduit 172 leading to the compensating relief plunger 150. The speed control load or relief valve is also provided with a drain conduit 174 leading to the reservoir 92, as in the case of the main relief valve.

The accumulator load or relief valve 148 when opened, provides communication between the conduit 160 and the conduit 176 which connects to the port 118 leading to the accumulator. The accumulator load or relief valve is further provided with a drain exhaust 177, as in the case of the relief valves previously described. A branch passage 178 interconnects with the conduit 176, and leads to an inlet port 180 associated with the main control valve, which will be presently described.

The structure of the compensating relief plunger 150 is illustrated in Fig. 14. It will be seen that the plunger 150 is in the form of a valve cap member urged toward closed position by a compression spring 182 under predetermined stress, held in position by a screw 184 screw threaded into the main valve casing or block 26. The plunger 150 is arranged so that free and unrestricted communication is provided at all times between the conduit 172 and an aligned conduit 186, Figs. 8 and 14, forming a continuation thereof and leading to the adjustable orifice device 152. However, when the compensating relief plunger 150 is opened or moved to the left from the position as seen in Fig. 14, against the action of its compression spring 182, a part of the fluid from conduit 172 is diverted and permitted to escape through a passage 188 communicating with an exhaust passage 190 interconnecting with the main fluid reservoir 92. A passage 192, Figs. 8 and 14, interconnects the cup chamber of the plunger 150 with the exhaust conduit 194 leading from the orifice device 152, so that the fluid pressure on the exhaust side of the orifice is applied to the compensating relief plunger, to augment the action of the spring.

The structure of the feed speed control orifice mechanism is best shown in Figs. 9 and 10. It will be seen that the orifice device 152 is in the form of an elongated rotatable stem the outer end of which is provided with the handle or manual control knob 34 so that the stem can be conveniently rotated to desired adjusted position. In the vicinity of the aligned conduits 186 and 194 the stem is provided with a pair of cut-away or flat portions 198 and 200 interconnected by a conduit 202 so that by rotation of the stem, interconnection between the passages 186 and 194 may be cut off or opened to any desired degree so as to provide adjustable feed rate control for the hydraulic actuator 24, as will presently appear. A threaded knob 204, Fig. 9, acts as a lock nut for holding the adjustment knob 34 and the stem 152 in the desired adjusted position. An oil sealing arrangement 206 prevents leakage of the oil outwardly along the surface of the valve stem.

As shown in Figs. 8 and 12 the outlet conduit 194 of the feed speed control device leads to a port 208 associated with the main control valve structure. See also Fig. 15. The main control valve 140 is shown in its approach position in Fig. 11, in its feeding position in Fig. 12, and in its reverse position in Fig. 13. It will be seen that when the valve is shifted to the right, to its approach position, the reduced annular portion 210 thereof interconnects the inlet port 180, previously described, with a port 212 connected to the conduit 106 leading to one end of the actuator cylinder 24. Simultaneously the return line 108 from the cylinder which is interconnected with a port 214, Fig. 11, effects the exhausting of the fluid from the actuator cylinder through the central bore 216 of the valve into a chamber 218 which interconnects with an exhaust conduit 220, Fig. 8, leading to the back pressure relief valve 142. As shown in Fig. 8, the back pressure relief valve is arranged, when opened, to interconnect the passage 220 with an exhaust passage 222 leading to the fluid reservoir 92. As in the case of the other relief valve structures, a drain passage 224 is also provided for leakage fluid in the back pressure valve structure.

When the main control valve 140 is shifted to its intermediate or feeding position, as shown in Fig. 12, fluid from the inlet port 180 is blocked off, but fluid is now introduced from the inlet port 208 by means of valve recess 225 to the port 212 at a rate determined by the setting of the adjustable orifice feed control 152. The return fluid from the cylinder is exhausted through port 214 and through the central bore of the valve, as previously described.

When the valve 140 is shifted to reverse position, as shown in Fig. 13, fluid from the port 208 is blocked off, but inlet fluid from the port 180 is now directed to the port 214 connected to the rear end of the actuator cylinder so as to propel the cylinder in the opposite direction. The return fluid from the actuator passes through port 212 into the central bore of the valve to be exhausted through the back pressure relief valve 142, as previously described.

Referring to Figs. 8 and 9, it will be seen that the main control valve 140 is shifted by means of a pin 228 secured to a depending link 230 anchored to a rock shaft 232, the outer end of which carries the manual control handle 28. As best shown in Fig. 2, the valve actuating shaft 232 also has fixed thereto a rocker the lower arm 234 of which is cooperable with the feed dog 40, and the upper arm 236 of which is connected to a link 238 pivoted to the frame as indicated at 240. The outer end of this link is pivotally connected to the armature bar 242 of the solenoids 30 and 32.

Figure 18:
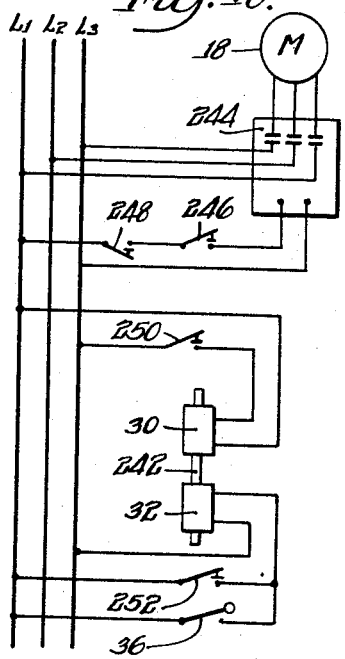
Fig. 18 is a schematic electrical diagram.

Referring to Fig. 18, a schematic illustration of the electrical circuit is shown. It will be seen that the motor 18 may be energized from the power lines $L_1$—$L_2$—$L_3$ by means of a suitable motor starter 244 adapted to be energized by means of a "Start" switch 246. The motor may be stopped at any time by the operation of "Stop" switch 248.

The operating cycle is started by the operation of "Cycle Start" switch 250 which energizes the solenoid 30 and shifts the main control valve to its approach position. The solenoid 32 may be energized to shift the valve to its reverse position either by the manual operation of "Return" switch 252 or by the automatic operation of the limit switch 36, previously described.

Operation

In the operation of the system it is assumed that the back pressure relief valve 142 has been set to a suitable back pressure, for example twenty-five pounds per square inch; that the speed control and accumulator load or relief valves 146 and 148 have been set to a suitable feeding pressure, for example two hundred pounds per square inch; that the main relief valve 144 has been set for a suitably higher relief pressure, for example three hundred pounds per square inch; that the main control valve 140 is in its return or reverse position of Fig. 13, and that the carriage is in its normal or fully retracted position as shown in Fig. 1.

Energization of motor 18 by the operation of "Start" push button 246 initiates the operation of the spindle 14 and also starts the pump 20, both of which remain continuously operable as the motor runs during use of the machine.

Figure 16:
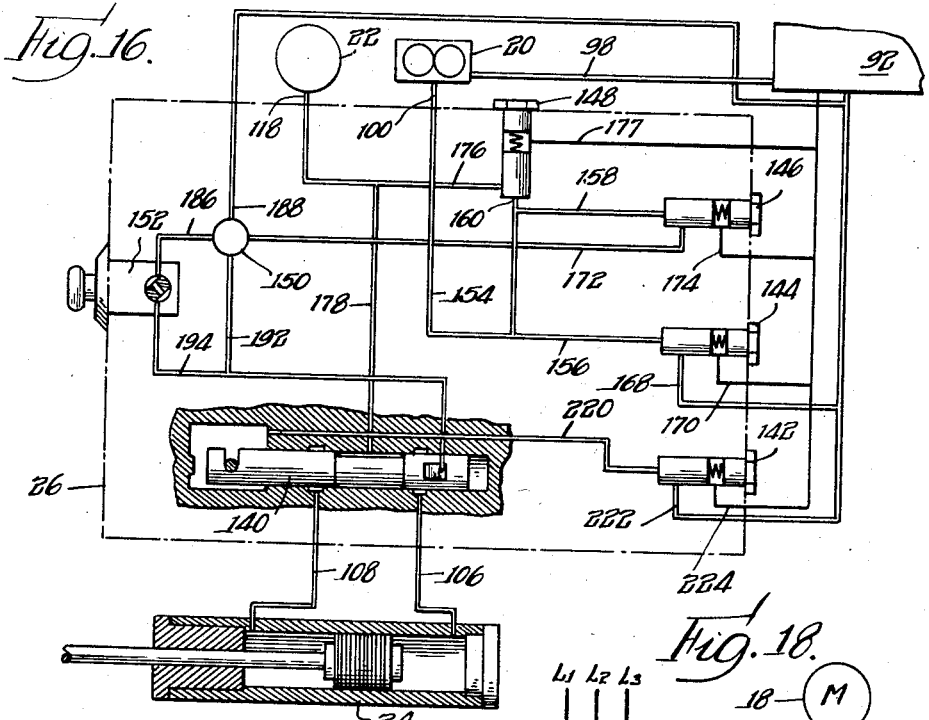
Fig. 16 is a hydraulic diagram.

Referring particularly to the hydraulic diagram, Fig. 16, starting of the pump causes fluid to be dispatched through the conduits 100, 154 and 160 and through the accumulator load or relief valve 148 to conduit 176 and into the accumulator 22. The valve 140 being in its return position, and the carriage 12 being fully retracted, the passage of fluid through the main control valve and to the actuator is blocked.

As the accumulator becomes filled, and the pressure in the accumulator reaches the predetermined set pressure of the main relief valve 144, the latter opens to spill the delivery of the pump.

Operation of the Cycle Start push button 250 energizes solenoid 30 to shift the valve 140 to its approach position as shown in Fig. 11. Main relief valve 144 thereupon closes, and fluid from the pump is dispatched through the accumulator load or relief valve 148, through conduits 176 and 178 to the valve 140, and thence through the port 212, Fig. 11, and to the actuator 24. The volumetric capacity of the pump is augmented by fluid discharged from the accumulator to conduit 178, thereby increasing the rate of approach travel of the frame 12, in respect to the size and volumetric capacity of the pump. The return fluid from the actuator passes through port 214, Fig. 11, and through exhaust line 220, Fig. 16, and the back pressure relief valve 142, at the back pressure setting thereof to the reservoir.

As the carriage 12 reaches a predetermined position in its approach movement, the dog 40 operates to shift the main control valve to its feed position, as shown in Fig. 12. Feeding fluid for the actuator is thereupon dispatched from the pump supply conduit 154 through conduit 158 and the speed control load or relief valve 146 to conduit 172, and thence through the compensating device 150, the speed control orifice 152 and the main control valve 140 to the actuator; the return fluid from the actuator passing through the main control valve 140 and the back pressure valve 142 as in the case of traverse movements. It will be noted that the several relief valves 142, 144, 146 and 148, are all of the type which open when a predetermined pressure is applied on the inlet side thereof, and thereupon remain open regardless of pressure conditions on the outlet side. The accumulator load or relief valve 148 acts as a check valve for fluid in the accumulator, and also loads and insures the maintenance of sufficient pressure in the pump supply line 154, to effect an adequate feed, even though the accumulator pressure may be low. Similarly the speed control load or relief valve 146 applies loading to the pump supply conduit so that a part of the pump fluid during feed is diverted to the accumulator to effect the recharging thereof, even though the feeding pressures required in any particular instance may be relatively low. Accordingly, during the feeding movement of the actuator part of the pump fluid passes through the accumulator load or relief valve 148 and into the accumulator to effect its recharging.

During the feed the compensating relief plunger 150 continuously by-passes a part of the fluid delivered to it, operating to maintain a substantially constant pressure drop across the orifice 152, thus maintaining uniform feeding regardless of pressure variations encountered by the actuator 24 in propelling the tool through the work. More particularly, it will be seen that the pressure in conduit 186 on the upstream side of the orifice is applied to one end of the compensating valve plunger 150, whereas the pressure in conduit 194 on the downstream side of the orifice is applied to the other end of the compensating valve plunger. If, for example, the tool should encounter a soft spot in the work, lowering the feeding pressure in line 194, this lowered pressure would be transmitted to the compensating plunger through the conduit 192 causing the plunger to shift to the left as seen in Fig. 14, thereby increasing diversion from the supply conduit 172 to the by-pass line 188 so as to lower the supply pressure on the upstream side of the orifice. The compensating plunger is thus responsive to pressure conditions on opposite sides of the orifice, and shifts to increase or decrease diversion through the conduit 188 in accordance with pressure variations encountered by the tool, to maintain a uniform pressure drop across the orifice and a uniform feeding rate.

During feed, if the accumulator should become filled to the desired preset operating pressure, the main relief valve 144 opens to divert the excess portion of the pump delivery.

As the tool reaches the extent of its forward feeding travel limit switch 36 is actuated by the adjustable control dog 38 whereby to energize solenoid 32 and effect the shifting of the valve 140 to its reverse position as shown in Fig. 13. Fluid from the pump, augmented by fluid from the accumulator, is now dispatched through the valve 140 to the port 214 so as to propel the actuator in itse reverse direction. As the actuator reaches home position the main relief valve 144 opens, after the fluid pressure within the accumulator has been replenished to the desired preset value.

Figure 17:
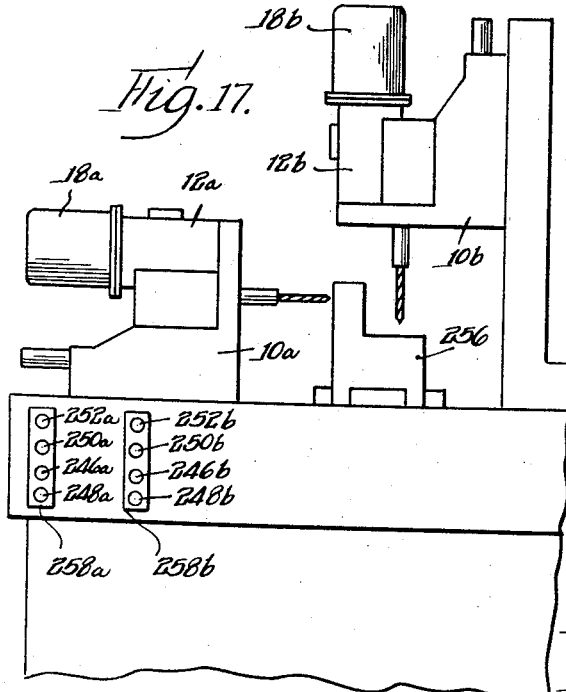
Fig. 17 is an illustrative view showing the manner in which the units of the invention may be combined and arranged in a machine tool structure.

In Fig. 17 the manner in which the units may be mounted as independent structures at desired stations in a machine tool is illustrated, two units being shown at 10a—12a and 10b—12b carrying tools operable upon a work piece 256. Each unit is provided with a control panel 258a and 258b upon which the various manual control switches, as illustrated in Fig. 18, may be conveniently mounted.

It will be seen that the structure provides a self-contained unit which is hydraulically and automatically actuated, and wherein the parts are arranged to effect an economy of space as well as an economy in structures and parts in respect to the working capacity of the unit. The structure may be readily mounted in various positions with full adaptability and without fluid leakage from the casing reservoir. The hydraulic circuit consumes a minimum of power in respect to the work done, thereby insuring adequate driving torque for the tool and decreasing the size and capacity requirements of the parts. The hydraulic circuit provides a full and readily adjustable range of feeding speeds, and a compensated or uniform feeding rate notwithstanding variations in pressure conditions encountered by the tool. A compact, low cost, and efficient unit structure is thus produced, imparting the advantages of unit construction to small size structures.

It is obvious that various changes may be made in the specific embodiment set forth without departing from the spirit of the invention. The invention is accordingly not to be limited to the specific embodiment shown and described, but only as indicated in the following claims.

The invention is hereby claimed as follows:

1. A machine tool unit comprising a base adapted to be secured to a support, a frame carried by the base and shiftably mounted in respect thereto, a rotatable spindle, a motor for driving the spindle, and hydraulic actuating mechanism for the frame comprising a pump driven by the motor, a control valve, and an accumulator, said spindle, motor, hydraulic actuating mechanism being carried by the frame and shiftable therewith in respect to said base, and valve means for effecting charging of said accumulator during one movement of the frame and for effecting delivery of fluid from the accumulator to the actuating mechanism during another movement of the frame.

2. A machine tool unit comprising shiftably mounted frame means, a rotatable spindle carried by said frame means, an actuator carried by said frame means, a pump carried by said frame means, a motor on said frame means for driving said spindle and said pump an accumulator carried by said frame means, and control valve means carried by said frame means and connecting said actuator, said pump, and said accumulator, said valve means comprising a main control valve, a feed rate control valve, and a load valve to effect the charging of the accumulator during feeding and idle portions of an operating cycle, said main control valve effecting discharge of said accumulator during rapid traverse portions of an operating cycle.

3. A machine tool unit comprising a shiftably mounted casing, a rotatable spindle carried by said casing an actuator carried by said casing, a pump carried by said casing, means carried by said casing for driving said pump and said spindle, and control valve means carried by said casing and connected between said actuator and said pump, said valve means including an orifice for controlling the rate of delivery of feeding fluid to the actuator, and a compensating valve for maintaining a constant pressure drop across the orifice during feed as the actuator encounters variations in load.

4. A machine tool unit comprising a casing, a rotatable spindle carried by said casing, an actuator carried by said casing, a pump carried within said casing, an accumulator carried within said casing, means carried by said casing for driving said pump and said spindle, and control valve means carried by said casing and interconnecting said actuator, said pump, and said accumulator, said valve means including an orifice for controlling the rate of delivery of feeding fluid to the actuator, and a compensating valve for maintaining a constant pressure drop across the orifice during feed as the actuator encounters variations in load.

5. A machine tool structure comprising support means having a mounting surface, a frame, a spindle rotatably mounted on said frame, and a base shiftably supporting said frame and mounted on said support means surface, said base including a pair of mounting surfaces disposed at an angle with respect to each other and at least one of said base surfaces traversing the axis of said spindle, said base surfaces being selectively engageable with said support means surface for mounting the base and, thus, the spindle in either desired position with respect to said support means surface.

6. A machine tool unit comprising a base member adapted to be secured to a support, said base member including a pair of relatively angularly disposed mounting surfaces selectively engageable with a support for mounting the base member in different positions with respect to the support, a frame member, support means for shiftably mounting the frame member on said base member, said support means comprising a pair of bars connected in parallel spaced relationship to one of said members and pairs of axially spaced annular bearing means mounted on the other of said members and respectively slidably receiving said bars, said frame member being located between the axially spaced bearing means of said pairs of bearing means, a rotatable spindle mounted on said frame member parallel to said bars, said pair of mounting surfaces being disposed for mounting the base member selectively to locate the spindle in either desired position with respect to the support, a motor for driving the spindle, and hydraulic actuating mechanism for the frame member comprising a pump driven by said motor, and a control valve, said motor and hydraulic actuating mechanism being carried by said frame member and shiftable therewith with respect to said base member.

7. A machine tool unit, as defined in claim 6, wherein said hydraulic actuating mechanism includes piston means connected with said spindle and operable in a direction parallel to said bars.

8. A machine tool unit comprising a base adapted to be secured to a support, said base having a pair of relatively angularly disposed mounting surfaces selectively enagageable with a support surface for mounting the base in different positions with respect to said support, a frame carried by the base and shiftably mounted for reciprocable movement in a predetermined direction with respect to said base, a rotatable spindle having an axis of rotation parallel to said direction of reciprocable movement, said pair of mounting surfaces being disposed for mounting said base selectively to locate said spindle axis in predetermined positions with respect to the support, a motor for driving the spindle, and hydraulic actuating mechanism for the frame comprising a pump and a control valve, said spindle, motor and hydraulic actuating mechanism being carried by the frame and shiftable therewith in respect to said base.

9. A machine tool unit comprising a base adapted to be secured to a support, said base having a pair of relatively angularly disposed mounting surfaces selectively engageable with a support surface for mounting the base in different positions with respect to the support, one of said mounting surfaces being provided with an apertured central portion, a frame carried by said base for reciprocable movement relative to the base in a direction parallel to one of said mounting surfaces, a rotatable spindle axially translatable through said apertured portion and having an axis of rotation parallel to said direction of reciprocable movement, a motor for driving the spindle, said pair of mounting surfaces being disposed for mounting the base selectively to locate the spindle axis in predetermined positions with respect to the support, and hydraulic actuating means for the frame comprising a pump, a control valve, and piston means connected to said spindle and reciprocable in a direction parallel to said first mentioned direction, said spindle, motor and hydraulic means being carried by the frame and shiftable therewith in respect to said base.

10. A machine tool unit comprising a base adapted to be secured to a support, a frame carried by the base and shiftably mounted in respect thereto, hydraulic actuator means for shifting said frame, said frame forming a housing, a fluid reservoir within the housing, a pump within the housing and having a predetermined capacity, an accumulator within the housing, said housing including an integral chamber providing a portion of said accumulator, a rotatable spindle projecting through the housing, a motor carried by the housing for driving the spindle and pump, and control valve means carried by the housing hydraulically interconnecting said accumulator, pump, reservoir and actuator means for controlling movement of the frame at a relatively fast rapid traverse speed and a relatively slow feeding rate and for charging said accumulator during periods when fluid requirements of said actuator means are less than said pump capacity and for discharging fluid from said accumultor during rapid traverse movement of the frame.

References Cited in the file of this patent
UNITED STATES PATENTS

| | | |
|---|---|---|
| 1,565,927 | Green | Dec. 15, 1925 |
| 1,888,566 | Park | Nov. 22, 1932 |
| 2,051,052 | Morgan | Aug. 18, 1936 |
| 2,108,780 | Schauer et al. | Feb. 15, 1938 |
| 2,347,379 | Teeter | Apr. 25, 1944 |
| 2,369,425 | Becker | Feb. 13, 1945 |
| 2,748,627 | Goldschmidt | June 5, 1956 |